(12) United States Patent
Zhang (10) Patent No.: US 7,808,972 B2
(45) Date of Patent: Oct. 5, 2010

(54) METHOD FOR PROCESSING THE DISTRIBUTED PATH INFORMATION REQUEST

(75) Inventor: Renhai Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 317 days.

(21) Appl. No.: 11/986,373

(22) Filed: Nov. 21, 2007

(65) Prior Publication Data

US 2008/0069010 A1    Mar. 20, 2008

Related U.S. Application Data

(63) Continuation of application No. PCT/CN2006/001072, filed on May 23, 2006.

(30) Foreign Application Priority Data

May 24, 2005    (CN)    ........................ 2005 1 0074423

(51) Int. Cl.
   *H04L 12/56*    (2006.01)
(52) U.S. Cl. ...................... 370/351; 370/389
(58) Field of Classification Search ................ 370/351, 370/389, 392, 394
   See application file for complete search history.

(56) References Cited

U.S. PATENT DOCUMENTS 5,317,566 A    5/1994    Joshi 6,817,018 B1 *  11/2004  Clarke et al. ................. 719/313
7,599,349 B2 *  10/2009  Vasseur et al. ............... 370/351
2006/0101142 A1 *  5/2006  Vasseur et al. ............... 709/225

FOREIGN PATENT DOCUMENTS

| CN | 1240082   | 12/1999 |
| CN | 1 866 852 | 11/2006 |
| EP | 1 883 181 | 1/2008  |
| JP | 7-327048  | 12/1995 |

OTHER PUBLICATIONS

English Abstract of CN 1240082 dated Dec. 29, 1999.
English Abstract of JP 7-327048 dated Dec. 12, 1995.
Renhai Zhang Huawei Defeng Li Huawei: "PCE Communication Protocol Application Model; draft-zhang-pce-comm-app-model-00.txt" IETF Standard-Working-Draft, Internet Engineering Task Force, IETF, CH, (2005) XP015039942.
Adrian Farrel Old Dog Consulting Jean-Philippe Vasseur Cisco Systems et al: "Path Computation Element (PCE) Architecture; draft-ietf-pce-architecture-00.txt" Standard-Working-Draft, Internet Engineering Task Force, IETF, CH, vol. pce (2005) XP015038788.

* cited by examiner

*Primary Examiner*—Dang T Ton
*Assistant Examiner*—Kevin Lee
(74) *Attorney, Agent, or Firm*—Finnegan, Henderson, Farabow, Garrett & Dunner LLP (57) ABSTRACT

A method for processing distributed path computation requests includes: storing all path computation requests in an autonomous system, in each of Path Computation Elements (PCEs); and performing a path computation by a PCE in accordance with a path computation request obtained from the all path computation requests.

13 Claims, 5 Drawing Sheets

METHOD FOR PROCESSING THE DISTRIBUTED PATH INFORMATION REQUEST

CROSS-REFERENCE TO RELATED APPLICATIONS

The present application is a continuation application of PCT application No. PCT/CN2006/001072, filed May 23, 2006, which claims the Chinese priority No. 200510074423.9, filed May 24, 2005.

FIELD OF THE INVENTION

The present invention relates to a technical field of network communication, and particularly to a method for processing distributed path computation requests.

BACKGROUND OF THE INVENTION

Traffic engineering concerns the optimization of whole network performance, and mainly aims to provide high-effective and reliable network services, to optimize the use of network resource, and to optimize network traffic. In particular, there are two aspects: one is traffic-oriented, i.e. to concern how to improve the quality of service in the network; the other is resource-oriented, i.e. to concern how to optimize the use of network resource, and mainly to optimize the effective utilization of bandwidth resource. As the deployment increases and General Multiprotocol Label Switching (GMPLS) develops, inter-domain traffic engineering will span different operators and cover the GMPLS network.

Constrained path computation, e.g. Constrained Shortest Path First (CSPF) computation is an important part of Multiprotocol Label Switching (MPLS) and GMPLS traffic engineering. Path computation among autonomous systems is complex, because computation entities within different autonomous systems should cooperate with each other to accomplish the path computation. A Path Computation Element (PCE) is a function entity, which can compute a path in accordance with a network topology architecture and constraint conditions. The PCE is compatible with the existing MPLS/GMPLS protocol and adaptable for operation mode of the existing MPLS/GMPLS network. The PCE, adopting a single signaling protocol and architecture, is adapted for different network environments, e.g. intra-domain, inter-domain and between different operators. The PCE allows operators or device manufactures to use different route algorithms, and compute routes in accordance with complex traffic engineering parameters and policies, thereby implementing a flexible system architecture. The PCE may be combined with a network element, or implemented in a separate server.

A PCE model-based path computation method may be adapted for inter-domain traffic engineering. The computation method does not affect the use of a computed path (the use of a computed path means, for example, establishment, maintenance and disconnection of a Label Switched Path (LSP)), but dedicates to computation of such an LSP.

Path Computation Client (PCC) refers to any client application which requests PCE for path information. In the PCE model-based path computation method, if a PCC such as an ingress Label Switching Router (LSR) which sends a path computation request desires to establish an LSP, the PCC first sends the PCE a request message including basic information such as path destination and various constraint conditions. The PCE receives the request, computes a path meeting the constraint conditions of the request in accordance with information such as Traffic Engineering Database (TED) and topology synchronized with the network, and returns the path to the PCC through a response message. The path is taken as an Explicit Route Object (ERO) parameter for establishing the LSP by the PCC. The computed path may include an explicit node (e.g. a router) and a loose node (e.g. a network segment, an area and an autonomous system).

In the PCE model-based path computation method, a computation made by each PCE usually covers an autonomous system. The autonomous system is particularly a range in which Traffic Engineering Database (TED) messages are distributed in an Interior Gateway Protocol (IGP).

In the PCE model, two basic protocols are required: PCE discovery protocol, responsible for PCC discovering the existence and computation ability of PCE, and selecting an appropriate PCE so as to send a path computation request to the selected PCE for computation in accordance with the information obtained from the protocol; and PCE communication protocol, mainly responsible for transporting path computation requests and response messages between PCCs and PCEs. The path computation requests from the PCCs contain various constraint conditions. If a PCE receives a path computation request which is specified to be processed locally, the PCE will perform a path computation accordingly.

At present, corresponding macro requirements are proposed for PCE communication. However, no corresponding solutions are proposed. The PCE communication protocol is being constituted.

SUMMARY OF THE INVENTION

In view of the above, an object of the present invention is to provide a method for processing distributed path computation requests, so that the distributed PCE can give sufficient consideration and avoid a possible race condition issue during a path computation. Therefore, the efficiency of path establishment in the network is increased.

The object of the present invention is achieved through the following technical solutions.

The present invention provides a method for processing distributed path computation requests, including:

storing all path computation requests in an autonomous domain, in each of Path Computation Elements (PCEs); and performing a path computation by a PCE in accordance with a path computation request obtained from the all path computation requests.

A global computing table is established and maintained in each of the PCEs, for storing the all path computation requests, and the global computing table includes:

a local_computing_table, for storing path computation requests which should be processed by a current PCE; and a remote_computing_table, including at least one table, each of which is adapted for storing path computation requests which should be processed by a remote PCE.

The states of the path computation requests in the global computing table include:

a Computing state, a Computed state and a Done state, or include a Computing state and a Done state, a state of a path computation request is set as Computing when a PCE receives the path computation request;

a state of a path computation request is set as Computed when a path computed result is obtained through path computation; and a state of a path computation request is set as Done when a path is established or a path establishment fails in accordance with a path computed result.

The method further includes:

removing said path computation request from the global computing table if the state of said path computation request becomes Done.

The global computing table is established and maintained with the processes of: determining, by path computation clients, one of PCEs in accordance with constraint conditions of each of the path computation requests and computation ability of PCEs, if the path computation clients request to establish a path;

sending the path computation requests from the path computation clients to all PCEs in an autonomous system, each of the path computation request carrying an identifier of the determined PCE; and determining by each of the PCEs whether the path computation requests should be processed by itself, in accordance with the identifier of the determined PCE; if the identifier of the determined PCE indicates that the path computation requests should be processed by itself, storing the path computation requests in the local_computing_table; otherwise, storing the path computation requests in the remote_computing_table.

The path computation requests are stored in turn in the local_computing_table or the remote_computing_table, in accordance with priorities of the path computation requests.

The method for processing distributed path computation requests further includes the process of determining whether there is a race condition between said path computation request and the path computation requests of other PCEs, which includes: determining whether said path computation request and the path computation requests of other PCEs occupy the same resource simultaneously and the resource can not meet the requirements simultaneously; and if yes, determining that there is a race condition; otherwise, determining that there is no race condition.

The process of determining whether there is a race condition between said path computation request and the path computation requests of other PCEs includes:

determining by said PCE whether there is a race condition between said path computation request and path computation requests of other PCEs in a Computed state in the remote_computing_table.

The path computation is performed after the state of a path computation request which involves in the race condition with said path computation request becomes Done if it is determined that there is a race condition The method further includes:

returning the path computed result from said PCE to the path computation client, while sending the path computed result to each of other path computation elements; and updating, by each of PCEs, the global computing table stored therein in accordance with the received path computed result.

The method further includes: returning the path computed result from said PCE to the path computation client, and establishing a path in accordance with the returned path computed result; and issuing the established path information to all PCEs in the autonomous system by the path computation client and updating by said PCE the path information and path computation requests in the global computing table stored in said PCE, if the path is established successfully.

The process of determining whether there is a race condition between said path computation request and the path computation requests of other PCEs includes: determining by said PCE whether there is a race condition between said path computation request and high-priority path computation requests of other PCEs in a Computing state and whether there is a race condition between said path computation request and path computation requests of other PCEs in a Computed state.

The path computation is performed after the state of the high-priority path computation requests of other PCEs in a Computing state becomes Done and after the state of the path computation requests of other PCEs in a Computed state becomes Done.

Another aspect of the present invention provides a path computation element for processing distributed path computation requests, containing: a local_computing_table for storing path computation requests of a current PCE; and a remote_computing_table including at least one table, each of which is adapted for storing path computation requests of a remote PCE; and the path computation element including: a processing unit, adapted for performing a path computation in accordance with a path computation request obtained from the local_computing_table and the remote_computing_table.

A further aspect of the present invention provides a system for processing distributed path computation requests, including at least two path computation elements, each of the at least two PCEs contains a local_computing_table for storing path computation requests of a current PCE; and a remote_computing_table including at least one table, each of which is adapted for storing path computation requests of a remote PCE; and each of the at least two PCEs includes a processing unit adapted for performing a path computation in accordance with a path computation request obtained from the local_computing_table and the remote_computing_table.

As described above, according to the present invention, all path computation requests to be processed in the domain are stored in each PCE, and the PCE selects, from the path computation requests stored in the PCE, a corresponding path computation request for path computation, which effectively avoids the possible race condition issue in path computation based on a path computed result during a distributed path computation. Therefore, the present invention effectively improves the accuracy of path computation of PCEs, avoids the fact that a PCC should send a path computation request for many times for one path establishment due to wrong path computations, reduces the interactions of protocols, and improves operating efficiency of protocols.

DETAILED DESCRIPTION OF THE INVENTION

The core of the present invention lies in that in the domain, each path computation element responsible for accomplishing path computation stores all path computation requests in the current domain. Therefore, a possible race condition in a distributed path computation can be effectively avoided, and it is ensured that the computed results of different path computation requests do not result in any race condition.

The present invention is described as follows with an example of implementing distributed path computation in a traffic engineering domain, i.e. a PCE autonomous system domain.

The PCE in the present invention may be implemented in a router, or in a specified server, to implement path computation within the autonomous system.

Figure 1:
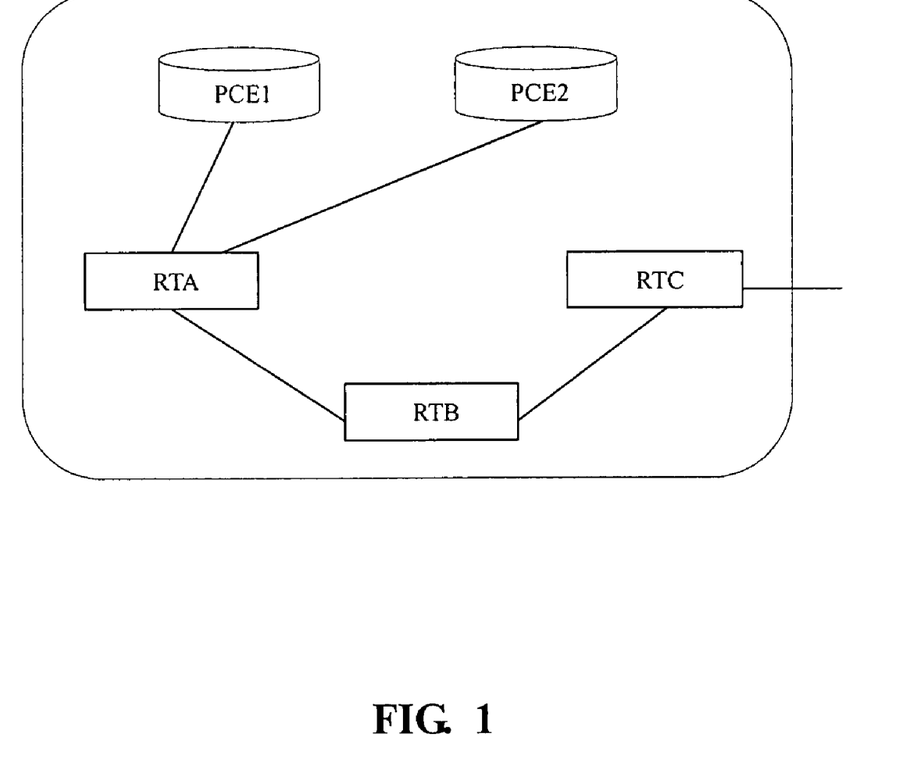
FIG. 1 is a schematic diagram of a networking architecture based on a Path Computation Element (PCE) mode.

In an autonomous system, corresponding path computations may be implemented by one or more PCEs. If there is only one PCE within the autonomous system, all path computation requests in the autonomous system will be sent to the PCE, this is called an integrated path computation method. As illustrated in FIG. 1, if there are multiple PCEs, all path computation requests in the autonomous system may be distributed to different PCEs, thereby realizing load sharing of path computation and reducing the possibility of computation failure for computation requests due to a PCE block. This is called a distributed path computation method.

In the distributed path computation method, before sending a path computation request, the PCC should know a computation ability of each PCE, e.g. computation ability of computing which Quality of Service (QoS), an ability of obtaining a protection link and a path for load sharing, an ability and rate of TED synchronization, so as to select an appropriate PCE from the PCEs and send the computation request thereto. The prior art can meet these requirements.

The present invention mainly concerns how to implement more reasonable path computation at the PCE side and rapidly obtains more accurate computed results. For this, the present invention needs to solve the possible race condition issue during path computation.

In a distributed PCE network, multiple PCEs may simultaneously process different path computation requests, e.g. a failed link is to be recovered, which will enable multiple ingress label switching routers (LSRs) to send path computation requests to different PCEs simultaneously, and thereby the multiple PCEs use and allocate a resource when processing the path computation requests, and further some Label Switched Paths (LSPs) fail to be established, so that the PCCs request the PCEs for computation again, which reduces the efficiency of PCE communication protocol.

An embodiment of the method of the present invention is detailed as follows in conjunction with the attached drawings in order to make the principle, characteristics and merits of the present invention understood.

For the purpose of solving the problems of race condition and load sharing during the path computation in PCE, in the present invention a corresponding global computing table should be established and maintained in each PCE, for storing all path computation requests within a domain. The implementation of the maintenance and application of a global computing table involved in the method of the present invention are described in detail as follows.

Figure 2:
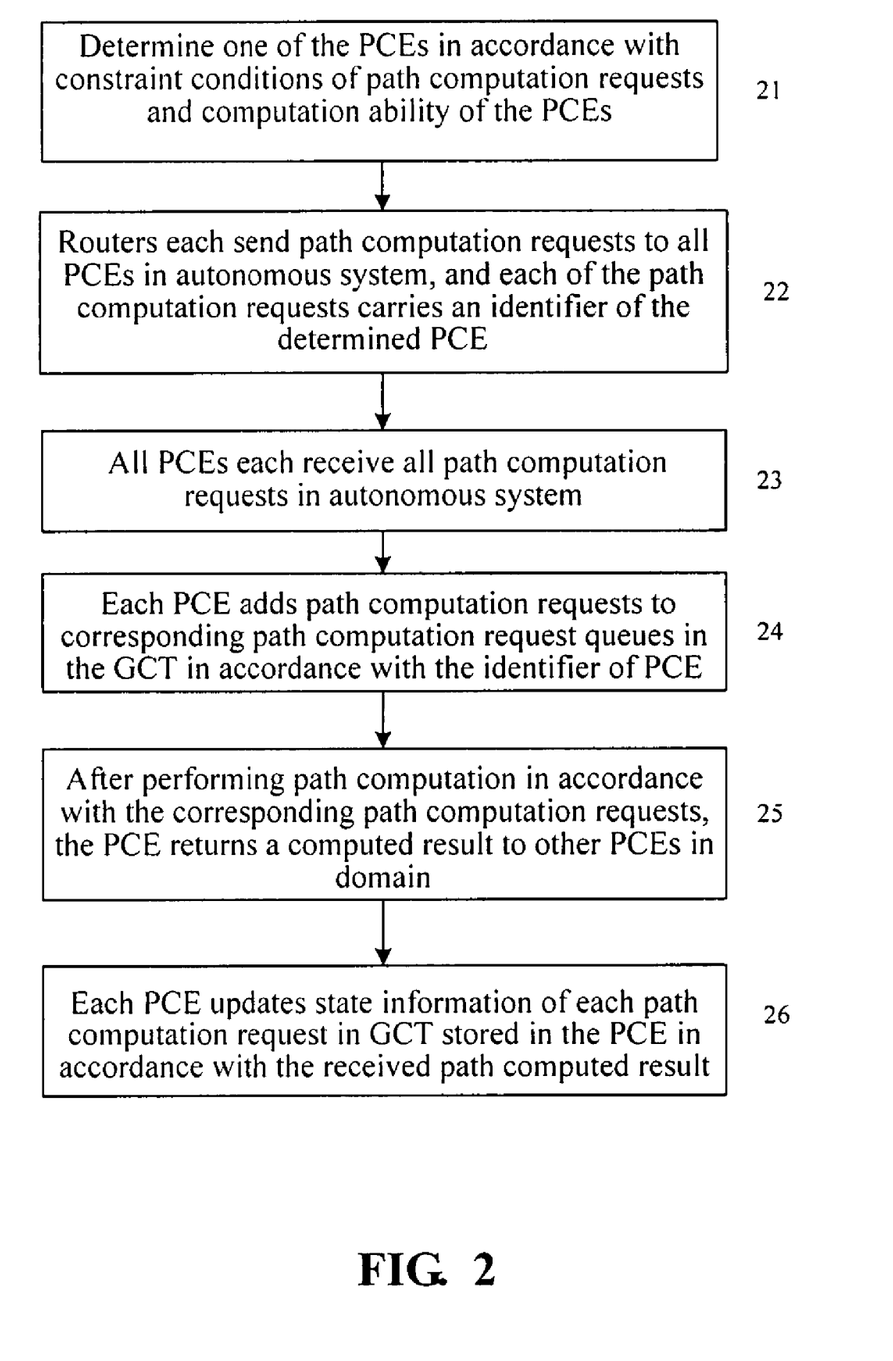
FIG. 2 is a flowchart of maintaining a global computing table in the present invention.

The maintenance of the global computing table is illustrated in FIG. 2.

Specifically, a global computing table is established and maintained in each PCE, for storing path computation requests which should be processed by all PCEs in an autonomous system. In accordance with the path computation requests, the PCE can accomplish corresponding path computations accurately.

Figure 3:
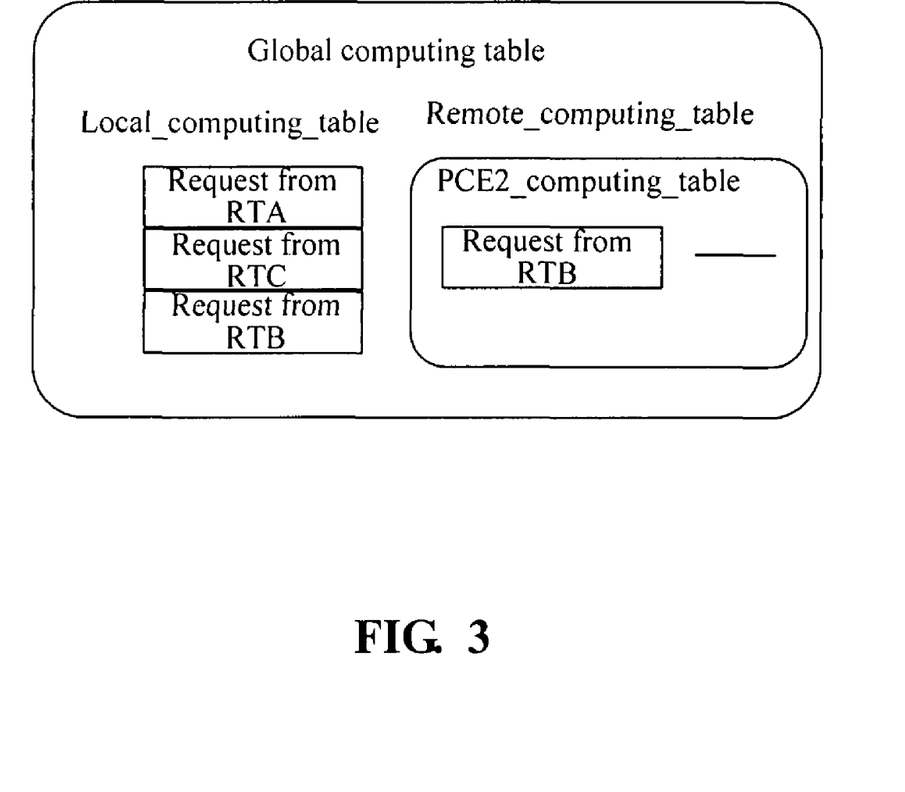
FIG. 3 is a structural schematic diagram of a global computing table in the present invention.

As illustrated in FIG. 3, the Global Computing Table (GCT) is specifically a table including path computation requests maintained in each PCE currently in the whole network and more specifically a table including path computation requests being processed and to be processed stored in each PCE in terms of PCEs corresponding to the computation requests.

How to maintain the GCT in each PCE is illustrated as follows.

In FIG. 1, an autonomous system is shown in a dashed line. The autonomous system includes three routers: RTA, RTB and RTC. In accordance with the PCE discovery protocol, each of the routers knows that the autonomous system includes two PCEs: PCE1 and PCE2.

As illustrated in FIG. 2, the update procedure of the GCT specifically includes the steps as follows.

Step 21: If three routers each have path computation requests, one of the PCEs is determined in accordance with constraint conditions of each path computation request and the computation ability of each PCE.

Step 22: The routers send path computation requests to all PCEs in an autonomous system, and each of the path computation requests carries an identifier of the determined PCE.

Specifically, when sending the path computation requests to the determined PCE, the routers also send the path computation requests to other PCEs in the autonomous system. For example, when sending a path computation request to PCE1, RTA also sends the path computation request to PCE2.

Each of the path computation requests should include an identifier of the determined PCE which will process the request. The identifier may be, for instance, the IP address of the determined PCE. The IP address segment does not act as a destination address of the request, but act as the identifier of the determined PCE which will process the request. Indeed, another identifier may be adopted for distinguishing the PCE from others.

Step 23: All PCEs each receive all path computation requests in the autonomous system through sending a request to all PCEs by each PCC.

Step 24: Each PCE, in accordance with the identifiers of PCEs in each of the path computation requests, adds each of the path computation requests to corresponding path computation request queues to be processed by the PCE in the GCT.

Specifically, each PCE determines, in accordance with each identifier of PCE, whether the PCE should process the path computation request, and processes the path computation request which should be processed by the PCE. Also, each PCE adds the path computation requests to corresponding queues in accordance with the identifiers of PCEs and priorities. Thus, in the autonomous system, each PCE has the same GCT.

For example, the GCT of PCE1 is illustrated in FIG. 3. In FIG. 3, a local_computing_table records a computing table being processed locally in a current PCE (i.e. PCE1). The local_computing_table includes three computation requests, which come from RTA, RTC and RTB respectively. An order of the computation requests indicates priorities of the computation requests, but does not indicate time sequence of reception of requests. The PCE will obtain the path computation requests orderly from the table, and perform path computation. In FIG. 3, a remote_computing_table is adapted to record path computation requests of all the other PCEs (i.e. remote PCEs) in the autonomous system. In FIG. 3, a PCE2_computing_table records current path computation requests of PGE2. If the autonomous system further includes a PCE3, there is further a PCE3_computing_table, and so on. Therefore, each PCE knows path computation requests being processed by other PCEs, and vice versa.

Step 25: After performing path computation in accordance with a corresponding path computation request, a PCE returns a computed result to not only the PCC but also other PCEs in the domain.

Step 26: Each PCE updates state information of each path computation request in the remote_computing_table stored in the PCE, in accordance with received path computed results of other PCEs.

Figure 4:
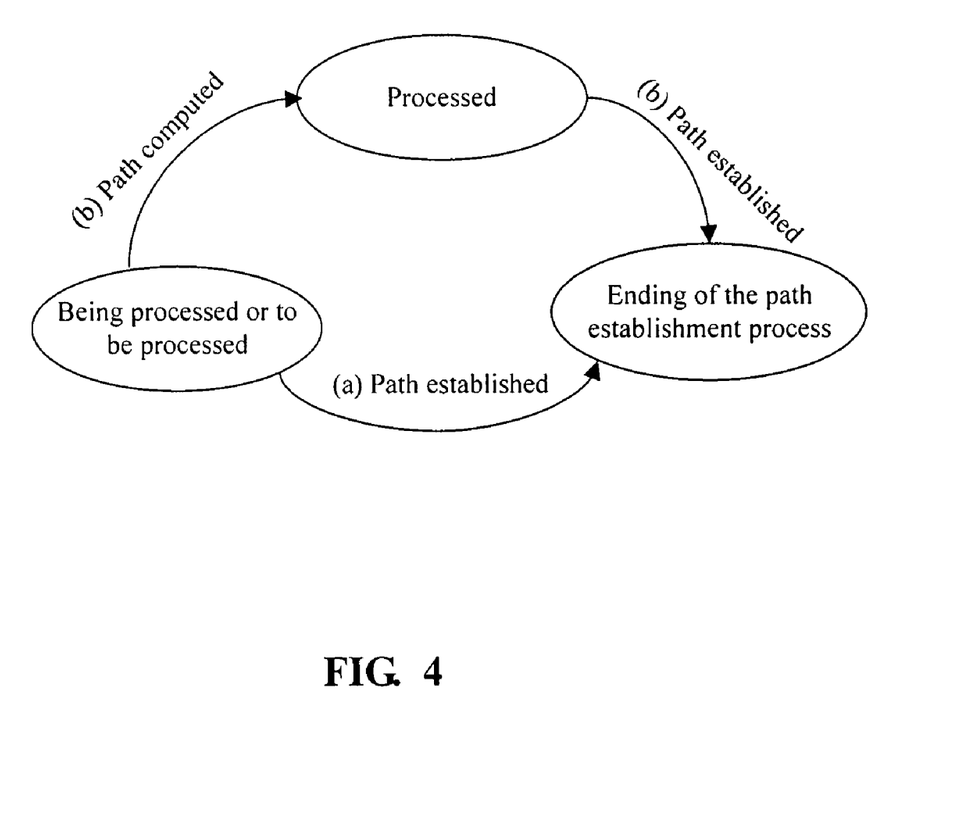
FIG. 4 is a flowchart of preventing a race condition in the present invention.

In other words, in the GCT, the path computation requests of each PCE are respectively set as respective states, as illustrated in FIG. 4, the states include: a Computing state for indicating a path computation request is being processed or to be processed, and a Computed state for indicating a path computation request has been processed. Or, only a Computing state for indicating a path computation request is being processed or to be processed is set.

The Computing state refers to the state of a request which is being processed or to be processed. When a PCE receives a computation request from a PCC and puts the computation request into a GCT, the state of the computation request is set as Computing. The Computed state refers to that: a computation request is responded, a computed result is obtained, the PCE has sent a response message to the PCC and notifies the result to other PCEs, and other PCEs update states of computation requests in accordance with the computed result. In this case the state of the path computation request becomes Computed from Computing.

The corresponding states are set for the purpose of performing a race condition check, i.e. when a path computation is to be performed, it is first checked whether there is a race condition between this path computation request and other path computation requests in a Computing state, to avoid an occurrence of a race condition.

Also, as still illustrated in FIG. 4, a Done state for indicating the ending of the path establishment process may be set for path computation requests of each PCE in the GCT. When the PCC establishes or fails to establish a corresponding path in accordance with the computed result returned from the PCE, it returns a corresponding message to the PCE. Upon receiving the corresponding message, the PCE sets the corresponding path computation request as the Done state, and removes the computation request from the GCT.

In the autonomous system, the local_computing_table and the remote_computing_table of each PCE in the autonomous system form the GCT. Because the PCE communication protocol is based on reliable transmission, all GCTs in all PCEs are consistent with each other. If there is no path computation request in the autonomous system currently, the GCT has no record.

The steps 25 and 26 may be also implemented as follows.

After performing path computation in accordance with a corresponding path computation request, a PCE returns a result to the PCC. The PCC sends downstream a signaling for establishing a Label Switched Path (LSP) through a Resource Reservation Protocol-Traffic Engineering (RSVP-TE) signaling, etc. by taking the computed result of the PCE as an Explicit Route Object (ERO) parameter. If an LSP is established successfully, the PCC issues the established LSP information to all PCEs through a parameter Record Route Object (RRO) of a returned message, so that all PCEs update LSP state information maintained in them to maintain the PCEs as synchronous with the network state, and update the states of path computation requests in GCT. For the PCE responsible for processing this computation request, when the computation is accomplished, the corresponding path computation request can be removed immediately from the local_computing_table. For other PCEs, this path computation request is stored in a remote_computing_table. The other PCEs will remove this path computation request from corresponding queues when receiving the message.

Figure 5:
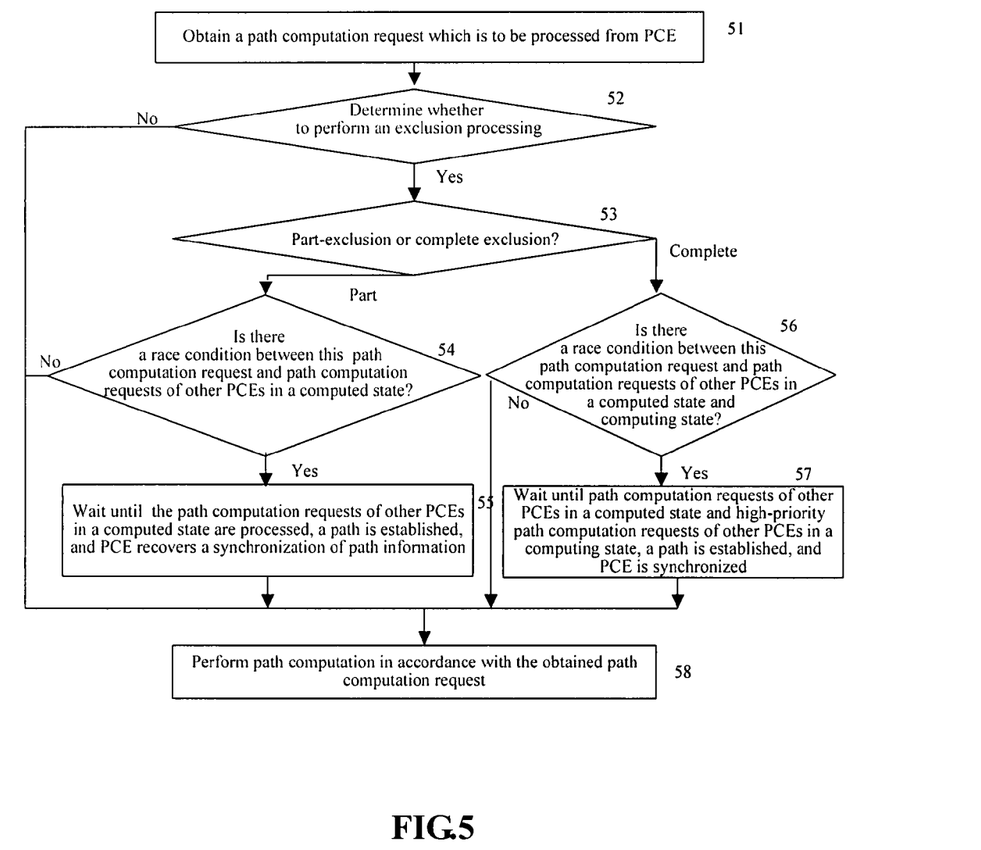
FIG. 5 is a flowchart of path computation according to an embodiment of the present invention.

Upon the establishment and maintenance of the above GCT, the present invention may adopt the GCT to solve a possible race condition during the path computation. The detailed solution, as illustrated in FIG. 5, includes the steps as follows.

Step 51: A PCE obtains a path computation request which shall be processed from a local_computing_table, i.e. from a path computation request queue of the PCE.

Step 52: A path computation mode corresponding to the path computation request is determined, and a corresponding procedure is selected to be performed.

Specifically, path computation modes are classified into three types: a direct computation mode, a part-exclusion mode and a complete exclusion mode. If a PCE performs a computation in accordance with a path computation request, the PCE should select a corresponding procedure in accordance with a path computation mode corresponding to the path computation request, so that a possible race condition during the path computation as required is solved.

A path computation mode corresponding to each path computation request may be determined by a PCC, and be carried in the path computation request when the PCC sends the request. In other words, before each PCC sends the path computation request to PCE, a path computation mode corresponding to the path computation request should be determined, to notify the PCE whether to perform an exclusion process when the PCE processes the request.

Therefore, in this step, it should be determined whether an exclusion processing is needed. If no exclusion processing is adopted, i.e. a direct computation mode is adopted, the procedure goes to step 58; otherwise, i.e. a part-exclusion mode or a complete exclusion mode is adopted, the procedure goes to step 53.

Step 53: It is determined whether a part-exclusion mode or a complete exclusion mode is adopted. If a part-exclusion mode is adopted, the procedure goes to step 54. If a complete exclusion mode is adopted, the procedure goes to step 56.

Step 54: Upon reviewing path computation request queues of other PCEs, the PCC determines whether there is a race condition between the upcoming computation and path computation requests of other PCEs in accordance with processed path computation requests of other PCEs, i.e. in accordance with path computation requests in a Computed state. Specifically, it may be determined whether there is a race condition in accordance with possible path information and resource type information of the path computation request. If there is a possible race condition, the procedure goes to step 55; otherwise, i.e. it is determined that there is no race condition, the procedure goes to step 58 with no need of waiting for other PCEs to accomplish computations.

In other words, when processing this path computation request, the PCE compares this path computation request with all requests in a Computed state in GCT in accordance with destination address, constrained path and type of requested resource of this request, etc. If it is determined that there is a race condition, the procedure goes to step 55; otherwise, the procedure goes to step 58.

Step 55: This path computation request is delayed to process. Specifically, step 58 is performed until requests in a Computed state become in a Done state, i.e. a path computed by the PCE is now being established by the PCC, a path establishment result should be fed back to PCEs, and the PCEs should be synchronized with path information to make the possibility of race condition disappear, in this case step 58 is performed, to process this path computation request.

In the part-exclusion computation, parallel computations between PCEs can be still possible. However, there may be a possible race condition between computations in local_computing_tables and in remote_computing_tables.

Step 56: It is determined whether there is a race condition between this path computation request and path computation requests processed or being processed in other PCE computation tables. If there is a race condition, the procedure goes to step 57; otherwise, the procedure goes to step 58.

Specifically, on the basis of the part-exclusion computation, in consideration of the path computation requests in a Computing state in remote_computing_tables, it is determined whether there is a race condition between this path computation request and the path computation requests in remote_computing_tables. If it is determined that there is a race condition between this path computation request and the path computation requests in a Computing state, the procedure goes to step 57.

Step 57: The procedure is delayed until a path is established in the PCC in accordance with all higher-priority path computation requests being processed (path computation requests in a Computing state) or processed which may result in a possible race condition with this path computation request, a path established result is fed back to the PCEs and the PCEs has implemented synchronization of path information. Then the procedure goes to step 58.

Path computation requests being processed with a priority higher than the priority of this path computation request are determined in accordance with priorities of path computation requests. For instance, if a priority of a computation request in a Computing state in a remote_computing_table is higher than that of the current computation request in the local_computing_table, the local request will be delayed until the state of the remote path computation request becomes Done from Computing.

In the complete exclusion computation, only those computation requests with no race condition can be processed in parallel between PCEs, and those computation requests with possible race conditions will be processed orderly through the mechanism between PCEs.

Step 58: A path computation is performed in accordance with the path computation request obtained in step 51. The specific computing mode may be identical to the prior art, or may be another applicable computing mode, which will not be described in detail here.

As described above, the present invention can effectively reduce a possibility of failures of path establishment due to race conditions in the case that distributed PCEs perform path computation. Therefore, the efficiency of path establishment is improved, and further the efficiency of network communication is improved.

The above are merely detailed embodiments of the present invention. The protective scope of the present invention is not limited to these embodiments. Any variation or substitution that can be achieved easily by those skilled in the art within the disclosure of the present invention shall be covered by the present invention if they fall within the scope of the present invention as defined in the attached claims.

The invention claimed is:

1. A method for processing distributed path computation requests, comprising:
   storing all path computation requests in an autonomous system, in each of a plurality of Path Computation Elements (PCEs); and
   performing a path computation by one of the PCEs in accordance with a path computation request obtained from the all path computation requests; wherein
   a global computing table is established and maintained in each of the PCEs, for storing the all path computation requests;
   the global computing table comprises:
      a local_computing_table, for storing path computation requests which should be processed by a local PCE, and
      a remote_computing_table, comprising at least one table, each of which is configured to store path computation requests which should be processed by a remote PCE; and
   states of the path computation requests in the global computing table comprise:
      a Computing state, a Computed state and a Done state, or comprise:
      a Computing state and a Done state, wherein
      a state of a path computation request is set as Computing when a PCE receives the path computation request;
      a state of a path computation request is set as Computed when a path computed result is obtained through path computation; and
      a state of a path computation request is set as Done when a path is established or a path establishment fails in accordance with a path computed result.

2. The method for processing distributed path computation requests according to claim 1, further comprising:
   removing said path computation request from the global computing table if the state of said path computation request becomes Done.

3. The method for processing distributed path computation requests according to claim 1, wherein the global computing table is established and maintained with the processes of:
   determining, by path computation clients, one of the PCEs in accordance with constraint conditions of each of the path computation requests and computation ability of the PCEs, if the path computation clients request to establish a path;
   sending the path computation requests from the path computation clients to all PCEs in the autonomous system, each of the path computation requests carrying an identifier of the determined PCE;
   determining by each of the PCEs whether each of the path computation requests should be processed by itself, in accordance with the identifier of the determined PCE; and
   if the identifier of the determined PCE indicates that the path computation requests should be processed by themselves, storing the path computation requests in the local_computing_table; otherwise, storing the path computation requests in the remote_computing_table.

4. The method for processing distributed path computation requests according to claim 1, wherein the path computation requests are stored in turn in the local_computing_table or the remote_computing_table, in accordance with priorities of the path computation requests.

5. The method for processing distributed path computation requests according to claim 1, further comprising the process of determining whether there is a race condition between said path computation request obtained from the all path computation requests and the path computation requests of other PCEs.

6. The method for processing distributed path computation requests according to claim 5, wherein the process of determining whether there is a race condition between said path computation request obtained from the all path computation requests and the path computation requests of the other PCEs comprises:

determining by said PCE whether there is a race condition between said path computation request obtained from the all path computation requests and the path computation requests of the other PCEs in the Computed state in the remote_computing_table.

7. The method for processing distributed path computation requests according to claim 6, wherein the path computation is performed after the state of a path computation request which involves in the race condition with said path computation request becomes Done if it is determined that there is a race condition.

8. The method for processing distributed path computation requests according to claim 1, further comprising:

returning the path computed result from said PCE to a path computation client, while sending the path computed result to each of other path computation elements; and  updating, by each of the other PCEs, the global computing table stored therein in accordance with the received path computed result.

9. The method for processing distributed path computation requests according to claim 1, further comprising:

returning the path computed result from said PCE to a path computation client, and establishing a path in accordance with the returned path computed result; and  issuing information of the established path to all PCEs in the autonomous system by the path computation client and updating by said PCE path information and path computation requests in the global computing table stored in said PCE, if the path is established successfully.

10. The method for processing distributed path computation requests according to claim 5, wherein the process of determining whether there is a race condition between said path computation request obtained from the all path computation requests and the path computation requests of the other PCEs comprises: determining by said PCE whether there is a race condition between said path computation request and high-priority ones of the path computation requests of the other PCEs in the Computing state and whether there is a race condition between said path computation request obtained from the all path computation requests and the path computation requests of the other PCEs in the Computed state.

11. The method for processing distributed path computation requests according to claim 10, wherein the path computation is performed after the state of the high-priority path computation requests of the other PCEs in the Computing state becomes Done and after the state of the path computation requests of the other PCEs in the Computed state becomes Done.

12. A Path Computation Element (PCE) for processing distributed path computation requests, containing: a local_computing_table for storing path computation requests of a local PCE; and a remote_computing_table comprising at least one table, each of which is configured to store path computation requests of a remote PCE; and the PCE comprising: a processing unit, configured to perform a path computation in accordance with a path computation request obtained from the local_computing_table and the remote_computing_table; and  states of the path computation requests in the local computing table and the remote computing table comprise:

a Computing state, a Computed state and a Done state, or comprise:

a Computing state and a Done state, wherein a state of a path computation request is set as Computing when a PCE receives the path computation request;

a state of a path computation request is set as Computed when a path computed result is obtained through path computation; and  a state of a path computation request is set as Done when a path is established or a path establishment fails in accordance with a path computed result.

13. A system for processing distributed path computation requests, comprising at least two Path Computation Elements (PCEs), wherein  each of the at least two PCEs contains a local_computing_table for storing path computation requests of a current PCE; and a remote_computing_table comprising at least one table, each of which is configured to store path computation requests of a remote PCE; and  each of the at least two PCEs comprises a processing unit configured to perform a path computation in accordance with a path computation request obtained from the local_computing_table and the remote_computing_table, and  states of the path computation requests in the local computing table and the remote computing table comprise: a Computing state, a Computed state and a Done state, or comprise:

a Computing state and a Done state, wherein a state of a path computation request is set as Computing when a PCE receives the path computation request;

a state of a path computation request is set as Computed when a path computed result is obtained through path computation; and  a state of a path computation request is set as Done when a path is established or a path establishment fails in accordance with a path computed result.

\* \* \* \* \*